United States Patent
Camille et al.

(10) Patent No.: US 7,061,917 B1
(45) Date of Patent: Jun. 13, 2006

(54) METHOD FOR TRANSPORTING DATA, A RELATED DATA TRANSMITTING ELEMENT AND A DATA RECEIVING ELEMENT

(75) Inventors: Peter Paul Camille, Heverlee (BE); Yves T'Joens, Sint Michiel-Brugge (BE); Carmelo Zaccone, Chatelet (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/384,422

(22) Filed: Aug. 27, 1999

(30) Foreign Application Priority Data

Aug. 9, 1999 (EP) ............................... 99402021

(51) Int. Cl.
*H04L 12/56* (2006.01)

(52) U.S. Cl. ................... 370/395.21; 370/236; 370/231

(58) Field of Classification Search ........ 370/230–234, 370/395.2, 395.21, 395.4–395.43, 391, 412–419, 370/422, 426, 463
See application file for complete search history.

(56) References Cited

U.S. PATENT DOCUMENTS

| | | | | |
|---|---|---|---|---|
| 5,634,006 A | * | 5/1997 | Baugher et al. | 709/208 |
| 5,892,754 A | * | 4/1999 | Kompella et al. | 370/236 |
| 5,907,556 A | * | 5/1999 | Hisanaga | 370/468 |
| 6,078,564 A | * | 6/2000 | Lakshman et al. | 370/235 |
| 6,163,808 A | * | 12/2000 | Kilkki | 709/233 |
| 6,286,052 B1 | * | 9/2001 | McCloghrie et al. | 709/238 |
| 6,359,863 B1 | * | 3/2002 | Varma et al. | 370/232 |
| 6,363,053 B1 | * | 3/2002 | Schuster et al. | 370/230 |
| 6,519,254 B1 | * | 2/2003 | Chuah et al. | 370/389 |
| 6,594,279 B1 | * | 7/2003 | Nguyen et al. | 370/468 |

FOREIGN PATENT DOCUMENTS

CN    1 219 053 A    6/1999

WO    WO 97/07638    2/1997

\* cited by examiner

*Primary Examiner*—Chi Pham
*Assistant Examiner*—Thai Hoang
(74) *Attorney, Agent, or Firm*—Sughrue Mion, PLLC

(57) ABSTRACT

The present invention relates to a method for transporting data between a data transmitting network element and a data receiving network element via a point-to-point connection in a communications network. This communications network comprises at least one transmitting network element and at least one data receiving network element.

An Internet Protocol Control Protocol request for a service level of sending data is sent to the data receiving element by the data transmitting element. This Internet Protocol Control Protocol request is received by the data receiving element. The data receiving element then determines a service level based on a predetermined criterion and formulates an Internet Protocol Control Protocol propose of the service level that can be provided to the data sending element. Subsequently the Internet Protocol Control Protocol propose of the service level is sent towards the data transmitting element. The Internet Protocol Control Protocol propose including the service level propose in its turn is received by the data transmitting element and used for sending data towards the data receiving element.

It is also possible to initiate the (re-)negotiation by the data receiving network element, by sending Internet Protocol Control Protocol messages to the data transmitting element.

As an alternative the data transmitting element is able to notice that a provided service level is not satisfying and that it formulates another request for a service level that is satisfying for the data transmitting element. Re-negotiation of an existing service level specification is also possible by sending Internet Protocol Control Protocol messages requesting another service level specification.

14 Claims, 2 Drawing Sheets

METHOD FOR TRANSPORTING DATA, A RELATED DATA TRANSMITTING ELEMENT AND A DATA RECEIVING ELEMENT

BACKGROUND OF THE INVENTION

The present invention relates to a method of transporting data transmitting network element (DTE) and a data receiving network element (DRE) via a point-to-point connection in a communications network, to a related data transmitting device, to a related data receiving element, and related software modules.

SUMMARY OF THE INVENTION

Such a method and related network elements are generally known in the art. A data transmitting network element sends data-packets towards a destination through a communications network via an edge network element of the communications network. In order to prevent from network congestion caused by a data transmitting network elements transmitting data without taking capacity-constraints and other possible constraints into account, a maximum service level is negotiated between each of such data transmitting elements and the edge element. Such a service level specification nowadays is negotiated between both parties in a static way, for example by phone call or by e-mail. There may be a policing means within the edge element to check if incoming data-packet flows are in conformance with the agreed service level specification. In case that the data transmitting network element at a certain moment of time needs another service level, this should be renegotiated in the same static way. Then the service level providing system should be updated to actually provide the agreed service level. This is a very time-consuming and inefficient way of negotiating service level specifications. Currently there is no automatic negotiation and re-negotiation and the subsequent updating of the Service Level Specification possible.

An object of the present invention is to provide a method of the above known type but wherein the service level specification negotiation and at the same time the adaptation is performed in a more efficient way.

According to the present invention, this object is achieved by the method as claimed in claims 1 and 2, the related elements as claimed in claim 3 and claims 5 and 6 and the related software modules as claimed in claims 7, 9 and 10.

Indeed, by negotiating a service level specification between a data transmitter and a data receiver and vice versa on both ends of a Point-to-Point connection, based on predetermined criteria, during the establishment of the Point-to-Point connection by sending Internet Protocol Control Protocol messages, a service level specification is agreed between both parties and this service level specification is updated at the data receiving element. For this purpose there are new options defined for the Internet Protocol Control Protocol that forms part of the Point-to-Point Protocol, where this options contain service level specific parameters.

This negotiation can be initiated by the data transmitting element as in claims 1, 5 and 7, or by the data receiving element as in claims 2, 6 and 10. In the latter case this is done by sending Internet Protocol Control Protocol messages to the data transmitting element if there are conditions that require the data receiving element to adapt the provided service level.

A further characteristic feature of the present invention is described in claims 4 and 8. The received propose for a service level at the data transmitting element may be not satisfying in one or another way for the data transmitting element. If so the data transmitting element is able to notice this and to formulate another request for a service level that is sufficient for the data transmitting element. Re-negotiation of an existing service level specification is also possible by sending Internet Protocol Control Protocol messages requesting another service level specification.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
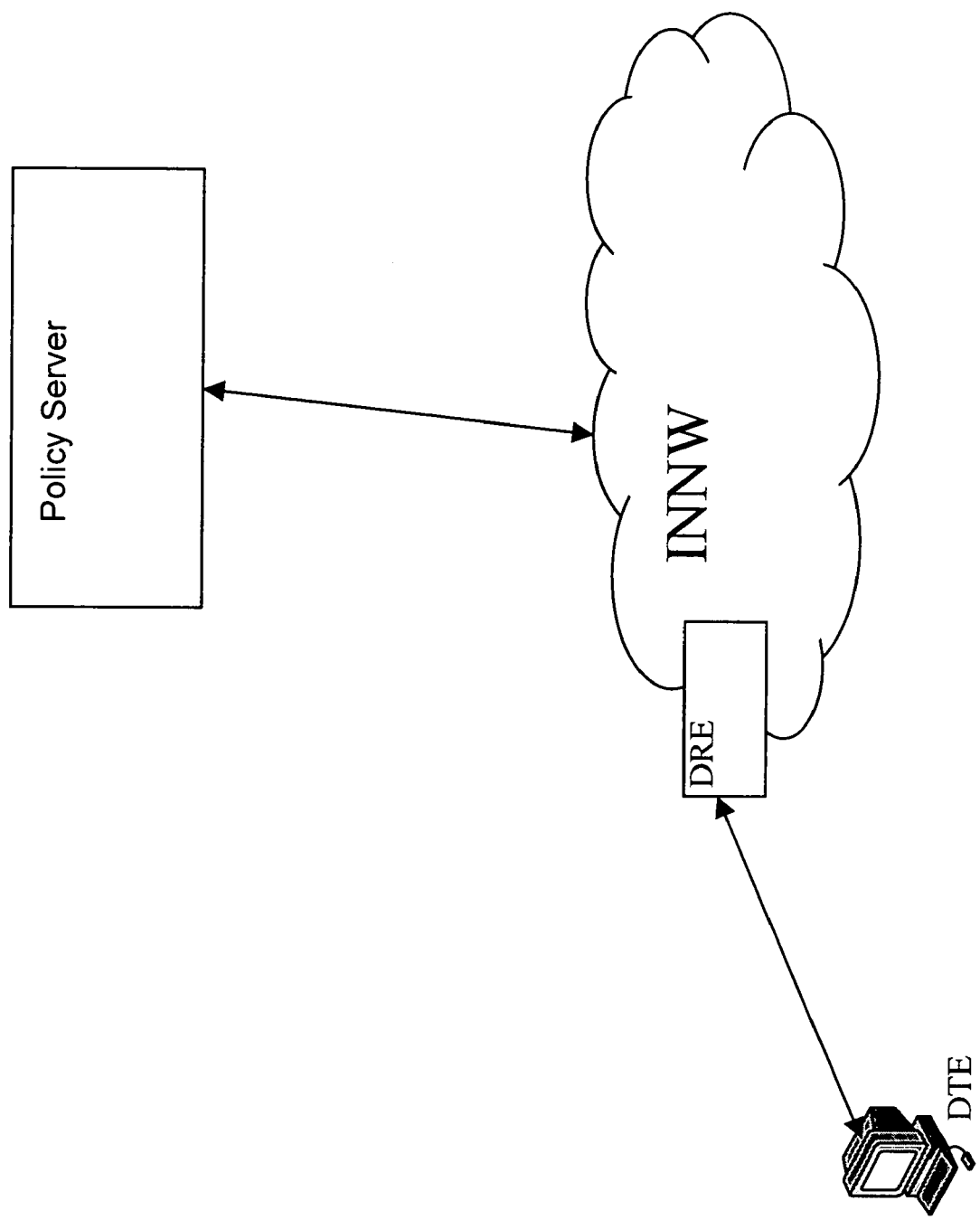
FIG. 1 represents an internet network INNW wherein the method for transporting data is performed.

In the following paragraphs, referring to the drawings, an implementation of the method according to the present invention will be described. Special attention will be drawn to the components of the data transmitting element and the components of the data receiving element as presented in FIG. 2. In the second paragraph, all connections between the before mentioned network elements and described components are defined. In the succeeding paragraph the actual execution of the service level specification negotiation is described.

The essential elements of this embodiment of the present invention are an internet network INNW, a data transmitting element DTE and a data receiving element DRE. In this embodiment the data transmitting element DTE is a customer premises equipment element, a personal computer.

This personal computer is used for sending data towards the data receiving network element DRE. The sending is done according to a pre-agreed service level specification defining quality of service aspects for the user of the personal computer. For example, in the service level specification specified Quality of service parameter is the maximum bit-rate of a certain diffserv class the sender is allowed to send.

In order to keep simplicity in this description it is chosen to only describe one personal computer DTE connected to the network, although there normally will be a plurality of such user-terminals.

Further there is a data receiving element DRE, that in this embodiment is chosen to be a network access server situated at the edge of the internet network INNW. This network access server provides the personal computer DTE access to the internet network INNW. Besides this, the network access server DRE may take care of policing the data the personal computer DTE sends towards the network access server DRE.

The personal computer DTE is to be connected to the internet via a Point-to Point Protocol connection, further referred to as a PPP-connection.

Figure 2:
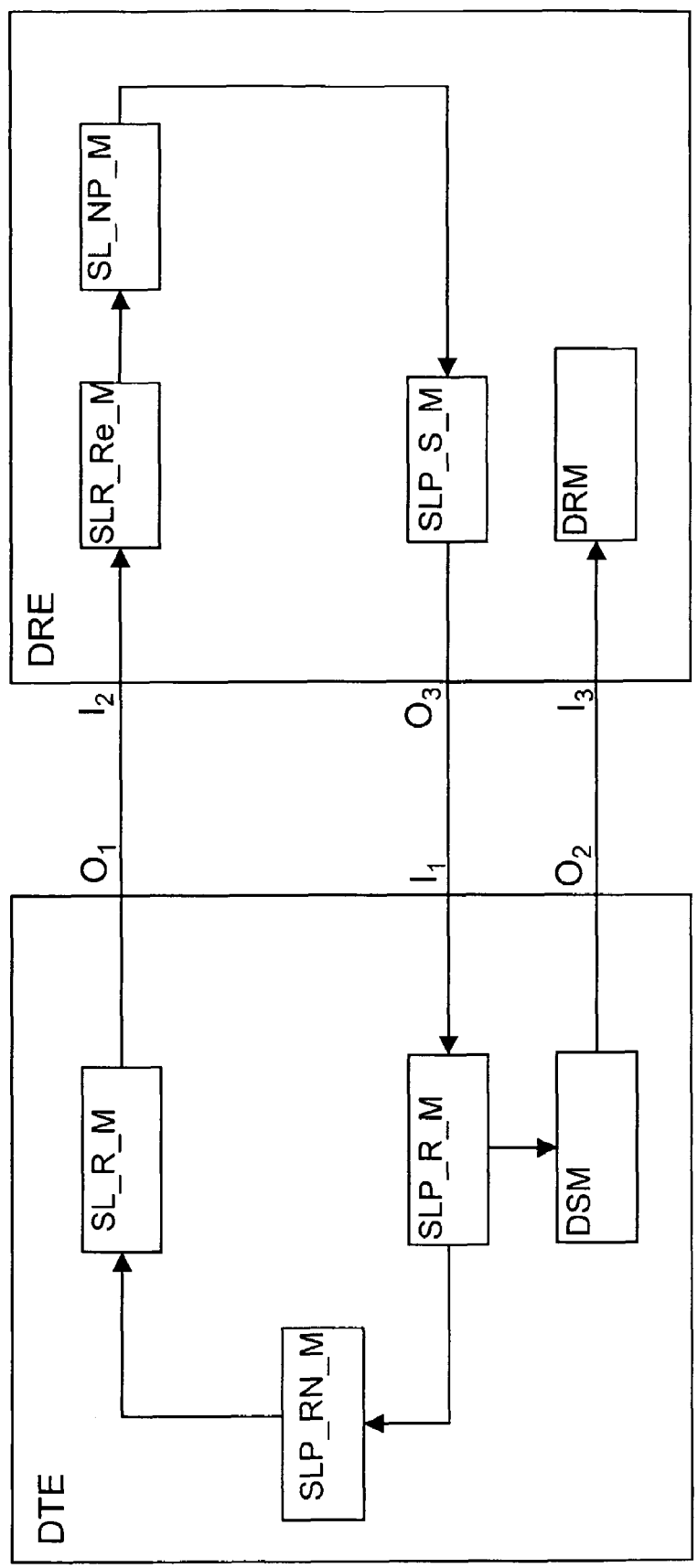
FIG. 2 represents the functional built-up of the data transmitting element DTE and the data receiving element DRE as presented in FIG. 1.

The data transmitting element DTE as presented in FIG. 2 is built up of a data sending means DSM that takes care of sending data towards the data receiving element and a service level requesting means SL_R_M that is able to send a request to the data receiving element DRE for a predetermined service level for sending data, using an Internet Protocol Control Protocol request message for this purpose. Further there is a service level propose receiving means SLP_R_M that is able to receive an Internet Protocol Control Protocol propose for the service level to be provided and subsequently to notify the data sending means DSM of the propose for the service level to be provided. The data transmitting element DTE also comprises a service level propose renegotiating means SLP_RN_M that is able to check if a received Internet Protocol Control Protocol propose for a service level is satisfying and if not to formulate another request for a service level.

The service level requesting means SL_R_M has an output-terminal that is at the same time an output-terminal $O_1$ of the data transmitting element DTE. The data sending means DSM has an output-terminal that is at the same time an output-terminal $O_2$ of the data transmitting element DTE.

Further, the service level propose receiving means SLP_R_M, has an input-terminal that is at the same time an input-terminal $I_1$ of the data transmitting element DTE and besides this an output-terminal that is coupled to an input-terminal of the data sending means DSM. The service level propose renegotiating means SLP_RN_M is coupled between a second output-terminal of the service level propose receiving means SLP_R_M and an input-terminal of the service level requesting means SL_R_M.

The data receiving element DRE as presented in FIG. 2 comprises a receiving means DRM that is able to receive data from the data transmitting element DTE. Further the data receiving element DRE contains service level request reception means SLR_Re_M that is adapted to receive a service level specification request from the data transmitting element DTE using an Internet Protocol Control Protocol message and a service level negotiating and proposing means SL_NP_M that is able to determine a service level specification based on at least one predetermined criterion and to formulate a propose for the service level specification. Then there is a service level proposal sending means SLP_S_M, that is adapted to send the propose for the service level specification using an Internet Protocol Control Protocol message.

The service level request reception means SLR_Re_M has an input-terminal that is at the same time an input-terminal $I_2$ of the data receiving element DRE and an output-terminal that is coupled to an input-terminal of the service level negotiating and proposing means SL_NP_M that in its turn is coupled with an output-terminal to an input-terminal of the service level request reception means SLR_Re_M. The service level proposal sending means SLP_S_M has an output-terminal that is at the same time an output-terminal $O_3$ of the data receiving element DRE. Then the data receiving means DRM contains an input-terminal that is at the same time an input-terminal $I_3$ of the data receiving element DRE.

In order to explain the operation of the present invention it is assumed that the personal computer DTE needs a specific quality of service that is specified in a service level specification. It is assumed that the personal computer DTE needs to establish a dial-in connection using the Point-to-Point Protocol. In a phase of this connection establishment, Internet Protocol Control messages, further referred to as IPCP-message are sent towards the network access server DRE to negotiate several connection-parameters, for example an Internet Protocol-address.

It is further to be noticed that all in the following mentioned IPCP-messages or requests are not the normally used messages or requests but a modified message or request in that sense that each IPCP-message may contain additional options carrying service level specification negotiable parameters.

In order to request a specific service level specification, the service level requesting means SL_R_M of the personal computer DTE sends an Internet Protocol Control Protocol request towards the network access server DRE for assigning another service level for sending data. The service level request reception means SLR_Re_M in its turn receives the Internet Protocol Control Protocol request for the service level from the data transmitting element DTE and forwards the request to the service level negotiating and proposing means SL_NP_M. The service level negotiating and proposing means SL_NP_M then determines a service level based on at least one predetermined criterion and subsequently formulates a propose for the service level to be provided. Such a criterion could be the current traffic on the outgoing links of the data receiving element DTE or a criterion available from a global network element like a policy server that can manage the entire internet network INNW.

Subsequently the service level negotiating and proposing means SL_NP_M hands the propose over to the service level proposal sending means SLP_R_M that in its turn sends an Internet Protocol Control Protocol message that contains the relevant parameters of the propose for the service level to the service level propose receiving means SLP_R_M of the data transmitting element DTE which receives the Internet Protocol Control Protocol propose for the service level. The service level propose receiving means SLP_R_M notifies the data sending means DSM of the propose for the service level.

The service level propose renegotiating means SLP_RN_M receives the forwarded service level propose from the service level propose receiving means SLP_R_M and subsequently checks if this Internet Protocol Control Protocol propose for the service level is satisfying. If not satisfying the service level propose renegotiating means SLP_RN_M formulates another request for the desired service level and forwards this towards the service level requesting means SL_R_M that in its turn further handles the request.

There may be a policing means (not shown in any of the figures) available within the data receiving element to determine if the data transmitting element sends data in compliance with the agreed service level.

It is to be remarked that the data receiving element DRE is also able to initiate a service level specification negotiation or re-negotiation by sending an unsolicited propose.

It is further to be remarked that the data transmitting element DTE and the data receiving element DRE in another embodiment may be implemented by two coupled routers.

Although the above embodiment of the invention has been described by means of functional blocks, their detailed realisation based on this functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

The invention claimed is:

1. A data transmitting element (DTE) to be used for sending data, over a link through a first communications network, towards a data receiving element (DRE) for communication of said data over a second communications network, said DTE comprising:
- data sending means (DSM), adapted to send said data towards said DRE;
- service level requesting means for generating an Internet Protocol Control Protocol (IPCP) message, for sending to said DRE, requesting a service level for communicating said data of said DTE over said second communications network; and
- service level proposal receiving means:
  - adapted to receive from said DRE an IPCP message indicating a proposed service level that said DRE can provide for communicating said data of said DTE over said second communications network, and
  - notifying said DSM of said received service level proposal,
  - wherein said DRE receives said data of the DTE over said first communications network and transmits said received data of the DTE in said second communications network.

2. The DTE according to claim 1, further comprising service level proposal renegotiating means, coupled between an output terminal of said service level proposal receiving means and an input terminal of said service level requesting means, for generating another IPCP message requesting a service level, different from the proposed service level indicated in said IPCP message from said DRE, in response to an indication that said proposed service level is not a satisfying service level.

3. The DTE according to claim 1, wherein said DTE is a user terminal and said DRE is an edge element of said second network.

4. The DTE according to claim 3, wherein said DRE is an access server provider and said second network is an internet network.

5. The DTE according to claim 1, said DTE further comprises a service level proposal renegotiating means for checking whether the service level proposal received from the DRE is satisfactory and when the service level is unsatisfactory, the service level requesting means generates a new IPCP message for sending to the DRE.

6. The DTE according to claim 1, further comprising generating means for generating data for transmission wherein the DTE is an element creating said data for transmission.

7. A data receiving element (DRE), to be used for receiving data from a data transmitting element (DTE), over a link through a first communications network, and communicating said data over a second communications network, said DRE comprising:
- data receiving means (DRM), adapted to receive said data from said DTE;
- service level request reception means for receiving an Internet Protocol Control Protocol (IPCP) message, from said DTE in said first communications network, said message indicates a requested service level for said communicating of said data of said DTE over said second communications network;
- service level negotiating and proposing means, coupled with said service level request reception means, for determining a service level that said DRE can provide for communicating said data of said DTE within said second communications network, based on at least one predetermined criterion and on said requested service level, and formulating, as a service level proposal, an IPCP message indicating said determined service level; and
- service level proposal sending means, coupled with said service level negotiating and proposing means, for sending said IPCP message as said service level proposal.

8. A data receiving element (DRE), to be used for receiving data from a data transmitting element (DTE), over a link through a first communications network, and communicating said data over a second communications network, said DRE comprising:
- data receiving means (DRM), adapted to receive said data from said DTE in said first communications network;
- service level negotiating and proposing means, for determining a service level that said DRE can provide for communicating said data of said DTE within said second communications network, based on at least one predetermined criterion and on said requested service level, and formulating, as a service level proposal, an IPCP message indicating said determined service level; and
- service level proposal sending means, coupled with said service level negotiating and proposing means, for sending said IPCP message as said service level proposal.

9. A software module for running on a processing system for inclusion in a data transmitting element (DTE), for sending data, over a link through a first communications network, towards a data receiving element (DRE) for communication of said data over a second communications network, said software module comprising:
- a data sending sub-module, adapted to send said data towards said DRE;
- a service level requesting sub-module, for generating an Internet Protocol Control Protocol (IPCP) message, for sending to said DRE, requesting a service level for communicating said data of said DTE over said second communications network; and
- a service level proposal receiving sub-module:
- adapted to receive from said DRE an IPCP message indicating a proposed service level that said DRE can provide for communicating said data of said DTE over said second communications network, and
- notifying said data sending sub-module of said received service level proposal,
- wherein said DRE receives said data of the DTE over said first communications network and transmits said received data of the DTE in said second communications networks.

10. A software module for running on a processing system for inclusion in a data transmitting element (DTE), for sending data, over a link through a first communications network, towards a data receiving element (DRE) for communication of said data over a second communications network, said software module comprising:
- a data sending sub-module, adapted to send said data towards said DRE;
- a service level requesting sub-module, for generating an Internet Protocol Control Protocol (IPCP) message, for sending to said DRE, requesting a service level for communicating said data of said DTE over said second communications network; and
- a service level proposal receiving sub-module:
- adapted to receive from said DRE an IPCP message indicating a proposed service level that said DRE can provide for communicating said data of said DTE over said second communications network, and
- notifying said data sending sub-module of said service level proposal;

a service level proposal renegotiating sub-module for checking whether the received service level proposal is satisfactory and for instructing said service level requesting sub-module to generate another service level request in an IPCP message with a different proposed service level, when the received service level proposal is found unsatisfactory.

11. A software module for running on a processing system for inclusion in a data receiving element (DRE), for receiving data from a data transmitting element (DTE), over a link through a first communications network, and communicating said data over a second communications network, said software module comprising:
  a data receiving sub-module, adapted to receive said data from said DTE;
  a service level request reception sub-module, for receiving an Internet Protocol Control Protocol (IPCP) message, from said DTE in said first communications network, said message indicate a requested service level for said communicating of said data of said DTE over said second communications network;
  a service level negotiating and proposing sub-module, co-operating with said service level request reception sub-module, for determining a service level that said DRE can provide for communicating said data of said DTE within said second communications network, based on at least one predetermined criterion and on said requested service level, and formulating, as a service level proposal, an IPCP message indicating said determined service level; and
  a service level proposal sending sub-module, co-operating with said service level negotiating and proposing sub-module, for sending said IPCP message as said service level proposal.

12. A software module for running on a processing system for inclusion in a data receiving element (DRE), for receiving data from a data transmitting element (DTE), over a link through a first communications network, and communicating said data over a second communications network, said software module comprising:
  a data receiving sub-module, adapted to receive said data from said DTE in said first communications network;
  a service level negotiating and proposing sub-module, for determining a service level that said DRE can provide for communicating said data of said DTE within said second communications network, based on at least one predetermined criterion and on said requested service level, and formulating, as a service level proposal, an IPCP message indicating said determined service level; and
  a service level proposal sending sub-module, co-operating with said service level negotiating and proposing sub-module, for sending said IPCP message as said service level proposal.

13. A method for data communication, comprising:
  setting a level of service for a data transmitting network element (DTE), said DTE being connected to a data receiving network element (DRE) via a point-to-point connection of a first communications network, said DRE being connected to a second communications network, said level of service relating to transporting data between said DTE and said second communications network via said DRE, wherein said level of service is set by:
  determining, at said DRE, a service level that said DRE can provide for communicating said data of said DTE with said second communications network, based on at least one predetermined criterion;
  formulating, at said DRE, an Internet Protocol Control Protocol proposal indicating said determined service level;
  sending said Internet Protocol Control Protocol proposal to said DTE; and
  receiving said Internet Protocol Control Protocol proposal at said DTE; and then
  transporting said data between said DTE and said second communications network via said DRE according to said level of service indicated in said Internet Protocol Control Protocol proposal.

14. The method for data communication as set forth in claim 13, further comprising:
  before said determining of said service level at said DRE:
  sending, from said DTE to said DRE, an Internet Protocol Control Protocol request indicating a requested level of service; and
  receiving at said DRE said Internet Protocol Control Protocol service level request sent from said DTE;
  wherein said determining of said service level at said DRE is based also on said requested level of service of said DTE.

* * * * *